United States Patent [19]

Kolmonen et al.

[11] 4,109,758

[45] Aug. 29, 1978

[54] LUBRICATING APPARATUS

[75] Inventors: Kalle Kolmonen, Nurmijärvi; Esko Muukka, Kuopio, both of Finland

[73] Assignee: Kevotek Oy, Helsinki, Finland

[21] Appl. No.: 755,008

[22] Filed: Dec. 28, 1976

[30] Foreign Application Priority Data

Dec. 29, 1975 [FI] Finland ................................ 753685

[51] Int. Cl.² ........................ F01M 1/00; F16N 29/00
[52] U.S. Cl. ................................................ 184/15 A
[58] Field of Search ................ 184/15 A, 15 B, 56 R, 184/56 A

[56] References Cited

U.S. PATENT DOCUMENTS

| | | | |
|---|---|---|---|
| 2,030,533 | 2/1936 | Pate | 184/15 A |
| 2,658,585 | 11/1953 | Klein et al. | 184/15 A |
| 2,684,733 | 7/1954 | Freiman | 184/15 A |
| 2,754,932 | 7/1956 | Clements | 184/15 A |
| 2,848,068 | 8/1958 | Abbott et al. | 184/15 A |
| 2,893,515 | 7/1959 | Schweisthal | 184/15 A |
| 3,031,033 | 4/1962 | Burrows | 184/15 A |
| 3,450,227 | 7/1969 | Montgomery | 184/15 A X |

*Primary Examiner*—David H. Brown
*Attorney, Agent, or Firm*—Darby & Darby

[57] ABSTRACT

A lubricating apparatus for a chain element driven by a transmission wheel including a lubricating nozzle which is automatically urged against the chain under the control of the position of said transmission wheel. The apparatus also includes cleaning means, also under the control of the position of the transmission wheel, which automatically cleans the chain before it is lubricated.

7 Claims, 4 Drawing Figures

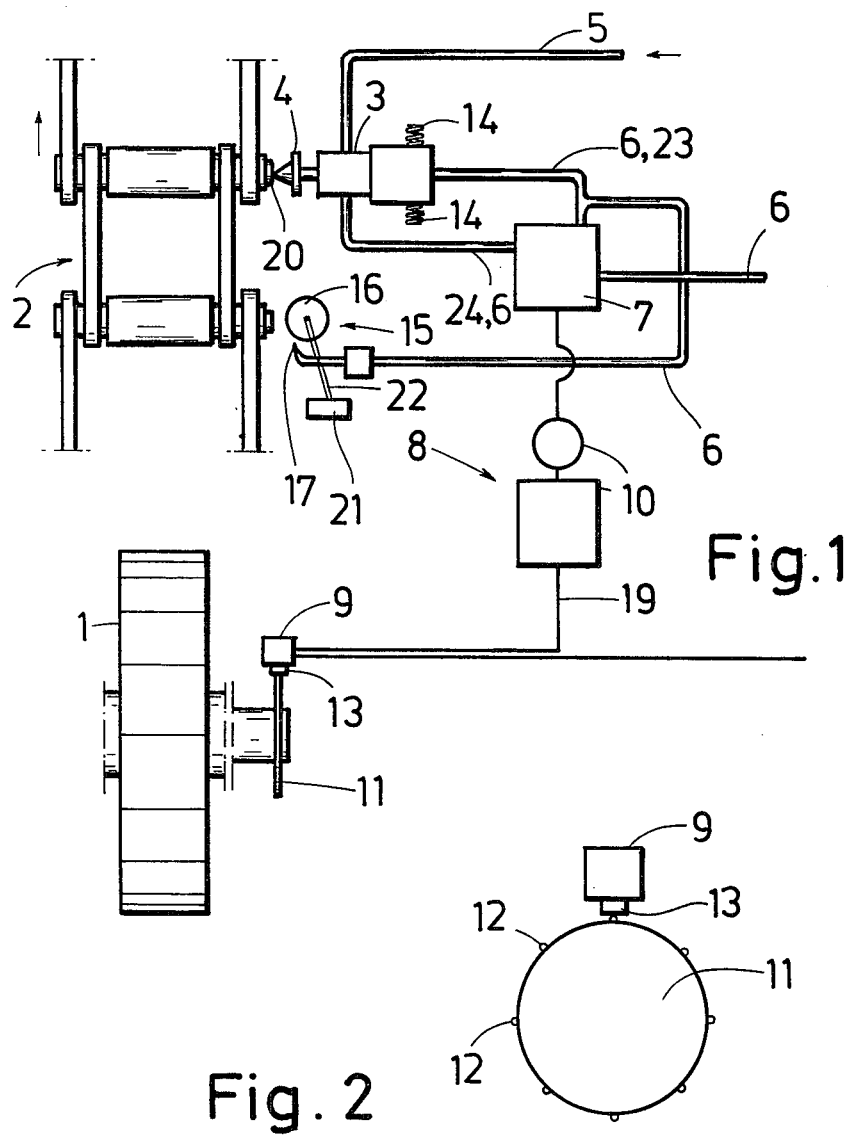
Fig. 1
Fig. 2
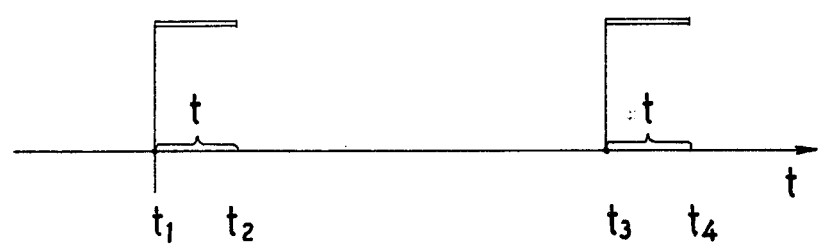
Fig. 3

LUBRICATING APPARATUS

The present invention concerns a lubricating apparatus intended for lubricating a chain-like machine element and which has been more closely defined in the part of claim 1 dealing with the state of existing art.

Lubricating devices of this kind are known, e.g., through the German application prints Nos. 2,255,053, 2,265,037, 2,352,868 and 2,436,582. The lubricating devices disclosed in the first two references are intended for squirting lubricating agent onto the machine element to be lubricated while this machine element is in motion. The lubricating apparatus disclosed in the third of the references is intended for pressing lubricant in lateral direction into the grease nipples of a chain-like machine element while the machine element is in motion. The apparatus disclosed in the last-mentioned German publication comprises lubrication nozzles which are radial and move radially in accordance with the movement of the machine element that has to be lubricated.

The above-described lubricating devices known in the prior art are primarily intended for use in the lubrication of the conveyor chains of wood conversion machines, in which application good results have also been achieved with their aid. These devices are not suited, however, for certain special uses, such as the lubrication of the extremely heavy conveyor chain employed in the feed conveyors of Voith grinders. The lubricating apparatus of the present invention is particularly suited to these applications.

The following operating conditions make the prior art lubricating devices unsuitable for use in the lubrication of Voith grinders: (a) the parts of the Voith conveyor are too heavy to be lubricated by the prior art lubricating devices; (b) Voith-type conveyors require lubrication directed to the grease nipples of the conveyor. This function is not accomplished by the lubricating devices of the first two German references cited above; (c) the operating conditions of the Voith grinder is extremely dirty. The lubricating device disclosed in the German publicizing print No. 2,352,868 is too mechanically complex to be used reliably in this environment.

The object of the present invention is to afford a new type of lubricating apparatus which is free of the drawbacks mentioned and which is particularly suited for the lubrication of the conveyor chain of a Voith grinder.

The elements included in the lubricating apparatus of the present invention can all be easily protected against grinding dust, moisture, and other external dirt, and the apparatus is therefore eminently suitable to be used in connection with the Voith machine. Furthermore, the pulse means comprised in the apparatus delivers an accurate control pulse, and thereby an accurate starting time, for the lubrication regardless of dirty operating conditions. The duration of lubrication may be controlled by means of a control device, such as a clock means, belonging to the apparatus.

In one preferred embodiment of the invention a pulse means for controlling the timing of the lubrication is electrically operated. The pulse means includes a flange, with cams, connected to a transmission wheel, and a switch operated by the cams and wherein the electrical pulse is formed. The starting time of lubrication is determined by the switch operated by the cam. It is therefore possible by adjusting the switch to fix the starting time to coincide exactly with the desired moment when the lubricating nozzle is adjacent to the lubricating nipple.

In a second preferred embodiment of the invention the pulse means is one operating with the aid of a pressurized fluid. It comprises a pipe system for the pressurized fluid, a flange with cams connected to a transmission wheel, and a pulse member operated by the cams. The pulse means compresses the pressurized fluid, which is a liquid or a gas, to produce a control pulse, which is then conducted through said pipe system to control an action valve, and thereby control the lubricating member.

In a third preferred embodiment of the invention the lubricating apparatus comprises at least two lubricating members with lubricating nozzles, and a pulse control means is provided to control the lubricating members. The number of lubricating members may be greater than two, all of which are controlled by one common pulse means. The lubricating members may also be controlled with the aid of one controlling valve, which is then connected with each lubricating member by a separate, pressurized fluid conducting pipe system.

In a fourth preferred embodiment of the invention the lubricating apparatus comprises an elastic fixing means for affixing the lubricating apparatus elastically to a fixed base so that the fixing means allow the lubricating nozzle to travel along with the chain-like machine element during the lubricating process. This type of fixing for the lubricating apparatus is useful in the above-mentioned Voith grinder, wherein the velocity of movement of the feed chain is usually less than 20 cm per 10 min., whereby the feed chain moves so little during one lubricating period, e.g., between 0.5 and 5 mm, that only a small movement of the lubricating apparatus along with the lubricating chain is needed.

In a fifth preferred embodiment of the invention the lubricating apparatus comprises a cleaning means, controlled by a control means, for cleaning the machine element to be lubricated. The cleaning means may be, e.g., electrically operated or maneuvered with the aid of a pressurized fluid. The cleaning means can include a brush, or the equivalent, moving in the direction of motion of the machine element, at right angles to this direction or rotating. The cleaning means may further include a force means, controlled by a control means, for urging the cleaning means against the mechine element to be lubricated.

Following is a detailed description of an embodiment of the invention, reference being made to the attached drawings, wherein:

FIG. 1 presents schematically a lubricating apparatus according to the invention;

FIG. 2 shows the pulse means of the lubricating apparatus of FIG. 1;

FIG. 3 illustrates graphically the operation of the lubricating apparatus of the invention.

Figure 4:
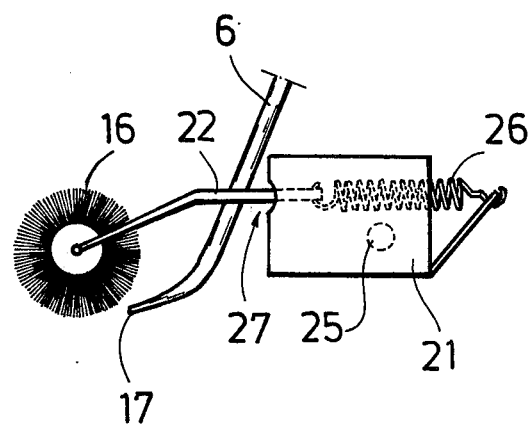
FIG. 4 shows a cleaning means according to an embodiment of the invention, for cleaning the machine element to be lubricated.

The lubricating apparatus of the invention is intended for lubrication of the endless, chain-like conveyor chain 2 passing around the transmission wheel 1. The lubricating apparatus includes a lubricating member 3 operable with the aid of a pressurized fluid and comprising a lubricating nozzle 4, this nozzle being connected to the lubricant supply pipe system 5. The lubricating nozzle 4 has furthermore been connected under control by the operating valve 7 to the pressurized fluid supply pipe 6. The lubricating apparatus further includes a control device 8 connected with the chain-like machine element synchronously, e.g., over a gear wheel, said control device controls the operation of the lubricating apparatus according to the state of motion and position of the machine element 2 to be lubricated, by mediation of the operating valve 7.

The control device 8 of the invention, shown in FIG. 1, includes a pulse means 9 for producing an electrical control pulse, and a pulse processing and duration control device 10 arranged to control the operating valve 7. Said components are arranged to operate in such manner that the pulse means 9 delivers a starting pulse as governed by the state of motion and position of the machine element 2. The control pulse is conducted by the conductors 19 to the pulse processing and duration control device 10, which is programmable to set the duration of the pulse to be delivered to the operating valve 7. In the embodiment presented here, the pulse means 9 comprises a flange 11 attached to the transmission wheel 1 of the conveyor chain, the flange 11 having cams 12 spaced along its circumferential edge, and the cams 12 operating a microswitch 13 upon rotation of the flange.

The lubricating apparatus of the invention operates as follows. The transmission wheel 1, e.g., a toothed power wheel, rotating in concord with the conveyor chain rotates the flange 11, whereby the cam 12 belonging to the latter will in the pulse means 9 produce an electrical control pulse when it touches the microswitch 13. The control pulse goes immediately along the lead 19 to the pulse processing and duration control device 10, which then delivers to the magnetic operating valve 7 a control pulse having the length of the lubricating time preprogrammed in the pulse processing and duration control device. As a result, the control pulse opens the compressed air valve of the operating tube 23 of the lubricating nozzle 4 and the lubricating member begins to operate. The lubricating nozzle 4 of the lubricating member 3 is pneumatically pushed towards the grease nipple 20 of the machine element 3 and is tightly coupled therewith. Furthermore, the nozzle 4 performs the dosage of lubricant and uncouples from the nipple 20 as soon as the operating valve 7 closes the operating tube 23 and opens the operating tube 24. All through the operation of the lubricating apparatus the machine element 2 proceeds slowly in the direction indicated by an arrow, while the lubricating nozzle 4 follows along with the movement of the machine element, while the elastic fixtures 14 yield elastically.

Simultaneously with the process of lubricating the grease nipple 20 of the machine element 2 in accordance with the above, the cleaning device 15 cleans the grease nipple of the machine element which is to be lubricated next. The cleaning means 15 begins to operate when the control device 8 opens the magnetic valve of the operating valve 7, whereby compressed air is free to discharge by the compressed air nozzle 17, thereby imparting a fast rotation to the rotary cleaning brush 16. At the same time the compressed air discharging from the compressed air nozzle 17 causes a reaction force with opposite direction and which displaces the compressed air nozzle downwardly in the figure, urging the cleaning brush, which is supported by the frame 21 with the aid of the fixing members 22, against the cleaning nipple. As a result of the rotary motion of the cleaning brush 16 the grease nipple is relieved of dirt, and it will be ready to be lubricated in the next step.

The cleaning means presented in FIG. 4, includes a frame 21 mountable on the mounting frame with the aid of a fixing means 25, and upon which the pressurized fluid nozzle 17 and the freely rotating brush 16 are mounted and pivoted with the aid of the fixing members 22. The fixing members proper, 22, are connected to the frame 21 in an elastic manner with the aid of the spring 26, carried by grooves 27 in the frame. The nozzle 17 is tangentially positioned with reference to the brush 16, whereby the pressurized fluid discharging from the nozzle, such as water, air, steam etc., sets the brush 16 in rotation. At the same time the fluid discharging from the nozzle 17 causes a reaction force, which tends to displace the cleaning means in the direction opposite to the discharge direction, i.e., from left to right in FIG. 4. The masses of the brush 16 and of the cleaning means and the ridigity of the spring 26 are suitably selected to insure that the brush 16 is first set into fast rotary motion with its bristles preferably pointing radially outward from the center, whereupon only the reaction force will urge the brush against the object to be cleaned.

In FIG. 3 the generation of the control pulse has been graphically illustrated, the forming of the control pulse having been indicated by the time $t_1$. In the same figure, the notation $t$ refers to the length of the control pulse programmable in the control device 8 with the aid of the pulse processing and duration control device 10, this being the time during which the magnetic valve of the operating valve 7 opens and the lubricating apparatus operates in above-described manner. On termination of the lubricating period $t$, at the moment $t_2$, the magnetic valve of the operating valve 7 closes, controlled by the control device 8, and the lubrication phase of the lubricating apparatus ends. The next lubricating step proceeds in equivalent manner, starting at the time $t_3$ and ending at the time $t_4$.

The invention is naturally not confined to the example presented, but its applications may vary within the scope of the claims following below. The lubricating apparatus may, for instance, be provided with ancillary devices for displacing the lubricating apparatus along with the chain to be lubricated during the lubricating phase and for returning it on termination of the lubricating period, such as rails, linkages, a return spring, and equivalent.

We claim:

1. Apparatus for lubrication of a chain element which travels around a transmission member comprising:
    controlled nozzle means for successively dispensing a lubricant to parts of said chain element;
    lubricating control means communicating with said nozzle for controlling the dispensing of the lubricant, said control means including pulse generator means, first means coupled to said pulse generator means and responsive to the position of the chain element to produce pulses to operate said control means and cause the nozzle to dispense the lubricant; and
    cleaning means responsive to said first means to clean a part of said chain element prior to said part receiving lubricant from said nozzle means.

2. Apparatus in accordance with claim 1 further comprising:
    a lubricating member, communicating with said nozzle means for supplying lubricant thereto;

a source of pressurized fluid, communicating with said lubricating member and said control means for communicating said pulses to said nozzle means and thereby causing said nozzle means to dispense lubricant; and pulse duration means communicating with said control means for controlling the duration of the pulses to thereby control the duration said nozzle means dispenses lubricant.

3. Lubricating apparatus in accordance with claim 1 wherein said first means comprises:

cam means rotating with said transmission member and electrical switch means positioned adjacent to and operated by said cam means.

4. Lubricating apparatus in accordance with claim 1 further comprising:

resilient mounting means for permitting said nozzle means to travel along with said chain element during the duration of lubrication.

5. Lubricating apparatus in accordance with claim 1 wherein said cleaning means comprises:

a brush, rotatably mounted and positioned for cleaning said chain element before said element reaches a position adjacent to said nozzle means;

second nozzle means for dispensing pressurized fluid, said second nozzle means being directed tangentially to said brush for rotating it;

said second nozzle means being responsive to said control means.

6. Lubricating apparatus in accordance with claim 5 wherein said pressurized fluid escaping from said second nozzle means urges said brush against the chain element.

7. Lubricating apparatus in accordance with claim 6 further comprising:

means for rotatably and pivotably mounting said brush to said second nozzle means;

said second nozzle means being directed so that the pressurized fluid escaping from said second nozzle means creates a reactive force which urges said brush against said chain element.

* * * * *